United States Patent [19]
Snyder et al.

[11] Patent Number: 5,303,334
[45] Date of Patent: Apr. 12, 1994

[54] SYSTEM FOR GENERATING A RASTERIZED GRAPHIC IMAGE

[75] Inventors: Douglas E. Snyder, Sunnyvale; Daniel J. Clark, Los Gatos; James McClure, Portola Valley, all of Calif.

[73] Assignee: Adobe Systems Incorporated, Mountain View, Calif.

[21] Appl. No.: 846,547

[22] Filed: Mar. 5, 1992

[51] Int. Cl.⁵ .............................................. G06F 15/62
[52] U.S. Cl. .................................. 395/109; 395/135; 395/129; 395/130; 358/298
[58] Field of Search ................................. 395/133–135, 395/100, 109, 128, 129–132; 358/298

[56] References Cited

U.S. PATENT DOCUMENTS

| | | | |
|---|---|---|---|
| 4,692,879 | 9/1987 | Ikuta | 395/109 |
| 4,755,813 | 7/1988 | Williams | 395/100 X |
| 4,918,622 | 4/1990 | Granger et al. | 358/298 X |
| 5,140,431 | 8/1992 | Cardillo | 358/298 |
| 5,170,257 | 12/1992 | Burns | 358/298 |
| 5,172,248 | 12/1992 | Urabe et al. | 358/298 X |

Primary Examiner—Gary V. Harkcom
Assistant Examiner—Almis Jankus
Attorney, Agent, or Firm—Roger S. Borovoy

[57] ABSTRACT

Apparatus and method for rendering graphic images as bit maps, including: (1) an input for receiving digital input commands; (2) a command interpreter to interpret the input commands and convert them into commands suitable for use inside the system; (3) a halftone screening section; and (4) a rendering section which outputs data suitable for use by a raster display or marking engine. The method and apparatus render multiple output pixels during each clock cycle and apply halftone screens or gray fills to an image.

36 Claims, 4 Drawing Sheets

SYSTEM FOR GENERATING A RASTERIZED GRAPHIC IMAGE

FIELD OF THE INVENTION

The system of this invention is a preferably single-chip control device for high performance, high quality display devices used in typesetters, image-setters, color printers and high throughput printers. The system is useful in interpreting input code and translating input instructions to provide graphical output, particularly in the form of source images, filled graphics, halftone screens and characters, either in black, white or filled with a selected gray halftone pattern.

BACKGROUND

The present invention is useful in many graphics co-processors. The system can be used to improve raster imaging in many applications, particularly when the desired output can be described in part using geometric primitives. Many printing devices are controlled by page description languages, including Adobe Systems' PostScript® language, Hewlett Packard's PCL™, Canon's LIPS, NEC's NPDL and other languages by Kyocera and Xerox.

In a preferred embodiment, the system is used to implement Adobe Systems PostScript commands. Adobe Systems is the assignee of the subject invention. The PostScript system was developed to communicate high-level graphic information to digital laser printers. It is a flexible, compact and powerful language, both for expressing graphic regions and for performing general programming tasks. The preferred embodiment of the system of this invention is described in the context of a PostScript printer, typesetter or image-setter.

The PostScript language, use and applications are thoroughly described in a number of books published by Adobe Systems Inc., including *PostScript Language Reference Manual* (Second Edition) and *PostScript Language Program Design*. PostScript and related page description languages are useful with typesetters, image-setters, color printers and high throughput printers as well as high-resolution video or other display devices.

Printing, video display and other such devices are sometimes called marking devices or marking engines. A raster image processor (RIP) associated with a marking engine converts input information and commands into a rasterized (bit-mapped) region suitable for display on the associated output device. Commercially available devices include the Apple LaserWriter®, the Linotronic® 100 and 300, the Adobe Atlas RIP and the Emerald RIP. A marking engine may use vertical or horizontal scan lines, but for convenience only horizontal scan lines are described here. The same or similar methods or devices can be used for vertical scan lines.

Some raster image processors use a graphic accelerator chip. One such chip is the Hitachi ARCTC chip, which can implement simple fills of rectangles and circles, simple line drawing, bit blitting and many Boolean combinations of these functions. NEC's 7220 chip also is popular, but cannot render complex geometric features. Hyphen has announced a graphic coprocessor chip, but that device is not yet publicly available for analysis.

SUMMARY OF THE INVENTION

The system of the present invention includes an input section for receiving digital input commands including commands which describe a region of the graphic image or specify a mode for filling the region. A command interpreter is coupled to the input section for interpreting the input commands and for translating the commands into internal commands for use inside the system. A screening section coupled to the input section and the command interpreter screens multiple pixels (generates a screened image) of a selected region of the graphic image with a halftone screen pattern during each system iteration. A rendering section coupled to the command interpreter and to the screening section renders and outputs device pixel data for a raster device. The system can be enhanced by incorporating a threshold memory coupled to the screening section for storing values in a halftone threshold array. The system can render multiple device pixels during each machine iteration, typically four per clock cycle. In some filling modes, the system can render 32 device pixels per clock cycle.

The method of the present invention includes generating a rasterized graphic image suitable for display on a raster display device or raster marking engine by receiving a first digital input command which describes a region of a graphic image, receiving a second digital input command which specifies a mode for filling the region with device pixel data corresponding to a specific raster device and translating the first and second digital input commands into at least one internal command to be executed in parallel with another internal command. Substantially simultaneously and for each one of a plurality of the raster device pixels, if the region is to be filled with a selected gray level, correlating the one raster device pixel with a corresponding threshold value in a reference array of threshold values, the reference array of threshold values corresponding to an array of pixels in a halftone screen pattern, then comparing the selected gray level with the corresponding threshold value and rendering the region by setting device pixel data for the raster device pixel according to its corresponding threshold value, the selected gray level and the second digital input command, whereby the region is filled with device pixel data to form a halftone screen pattern. Alternatively, if the region is to be filled with a solid color, the region is rendered by setting device pixel data for the one raster device pixel to represent the solid color and outputting the device pixel data in a form suitable for a raster display device or a raster marking engine.

The system of this invention can render screened regions at a sustained rate of 50 million pixels per second and a burst rate of up to 80 million pixels per second. This contrasts with rendering rates of about 500,000 pixels per second in a commercially available Atlas RIP or about 2.5 million pixels per second in an Emerald RIP. Looked at another way, the time to render an 8"×10" 300 dpi scanned source image on a 1200 dpi typesetter RIP with screening was about 1.4 seconds when using the GCP, approximately a 10-fold improvement over prior art devices or systems.

DETAILED DESCRIPTION OF THE INVENTION

Figure 1:
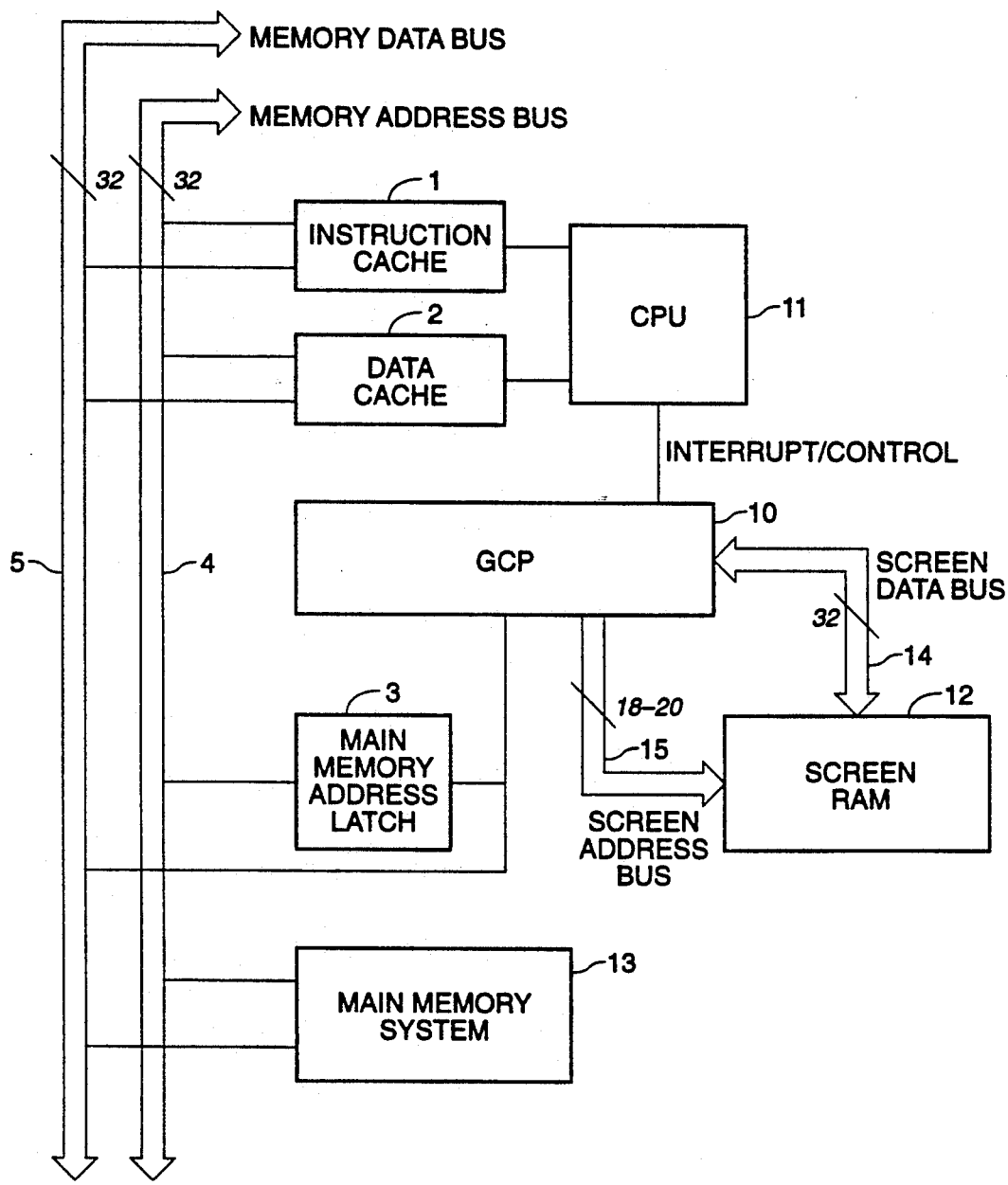
FIG. 1 is a block diagram illustrating the connection of the GCP system of this invention to other components of a graphics processing system.

The system of the present invention is designed to provide a co-processor to render detailed, high quality images on raster marking engines without requiring a host CPU to perform all of the rendering functions. Rendering a low resolution image may not require much time from a host CPU or from the co-processor in the system of this invention but rendering a high resolution image can take a great deal of time. Using the system and method of the present invention allows much faster rendering of high resolution images.

The system of this invention is designed for use in a co-processor architecture, particularly in the form of a single chip. For convenience, the preferred embodiment of the present invention will be referred to as the graphic co-processor or "GCP". The GCP operates on input commands, generally in the form of display list instructions, and allocates various rendering functions to units within the GCP which can operate in parallel to render multiple pixels of an output image per clock cycle. The output may be stored in a buffer within the GCP, in affiliated or connected memory, or may be sent to a storage device or directly to a marking engine.

High resolution marking engines which display a large number of lines can only render a fixed number of lines at a time. This is due in part to the fact that a very large number of pixels must be stored in memory at a time and constraints, including the speed and price of memory, limit the amount of memory available for any portion of a figure to be rendered. For devices having a resolution of more than about 2400 dpi, a typical band is smaller than the height of a typical capital letter. The marking engine and associated processing devices must therefore render even a single line of characters as a series of bands. The current band is often stored in a buffer, which is referred to as a band buffer.

In a preferred embodiment, the system of this invention consists of a single, relatively complex application-specific integrated circuit (ASIC), designated herein as a graphics coprocessor (GCP) for convenience, connected to up to four megabytes of high-speed support static RAM, although more or less RAM may be used if desired. Alternatively, support RAM may be incorporated into the same chip as the ASIC. The primary function of the system is to render scanned or synthetic source images in black and white, gray, or color using a fast, high-quality screening method into the RIP's frame or band buffer.

The system and method of this invention is particularly useful for processing and outputting halftone images, including synthetic and natural images. One halftoning method which may be implemented using the system and method of this invention is described and claimed in a co-pending application entitled "Method of Producing Halftone Images," Ser. No. 434,924, filed Nov. 8, 1989, by Stephen Schiller and assigned to the same assignee as this invention, incorporated herein by reference. That application describes a "Utah tile" halftoning method which permits nearly all screen angles and frequencies to be represented with an extremely high degree of accuracy. That method may use a threshold array of selected values as a reference for a region to be displayed. Other halftoning methods also can be implemented by the system and method of this invention, such as classical four-process-color screen angles. The resulting printed regions are substantially free of Moire patterns.

In the GCP, all commands and arguments which are specific to a particular graphical operation, including set-up and configuration information, are passed via direct memory access (DMA), while some initialization data can be passed under programmed I/O to registers inside the GCP hardware, for example, during power up. Completion of DMA transfers can be detected via polling or via an interrupt to the central processing unit (CPU).

Referring to FIG. 1, the system of this invention, GCP 10, can be used as a co-processor to host CPU 11 in a RIP, driven by a display list structure which may be held in main memory system 13. GCP 10 utilizes direct memory access (DMA) to main memory system 13 to retrieve and to store data as needed for various operations, e.g. to render scanned source images by halftoning, to perform graphic primitive area filling and to transfer character masks to an arbitrary frame or band buffer in memory, which may be in main memory system 13. FIG. 1 illustrates the connection of conventional elements including instruction cache 1 and data cache 2 to CPU 11 and to memory address bus 4 and memory data bus 5. Main memory system 13 is connected to memory address bus 4 and memory data bus 5. GCP 10 is connected to screen random access memory (RAM) 12 through screen data bus 14 and screen address bus 15. GCP 10 is also connected to CPU 11, to memory data bus 5 and through main memory address latch 3 to memory address bus 4. GCP 10 may use main memory system 13 or other memory (not shown) as external memory.

The system and method of this invention is capable of rendering trapezoids, run-arrays and marks (including compressed masks), each of which can be filled with black, white, or a selected gray level. An entire display list for a typical frame or band buffer device may be rendered in a single invocation of GCP 10 while the host CPU performs other operations in parallel, such as fetching the display list for the next band from disk or processing the next page.

The system of this invention is supported by other hardware within the RIP, including screen RAM 12, which holds one or more threshold arrays required to perform one or more selected screening methods. In one embodiment, screen RAM 12 is configured as 256K×32 bits. In other embodiments, screen RAM 12 can be configured as 64K×32 bits or other configurations, allowing the design engineer to trade off device design and manufacturing cost versus screening quality.

Figure 3:
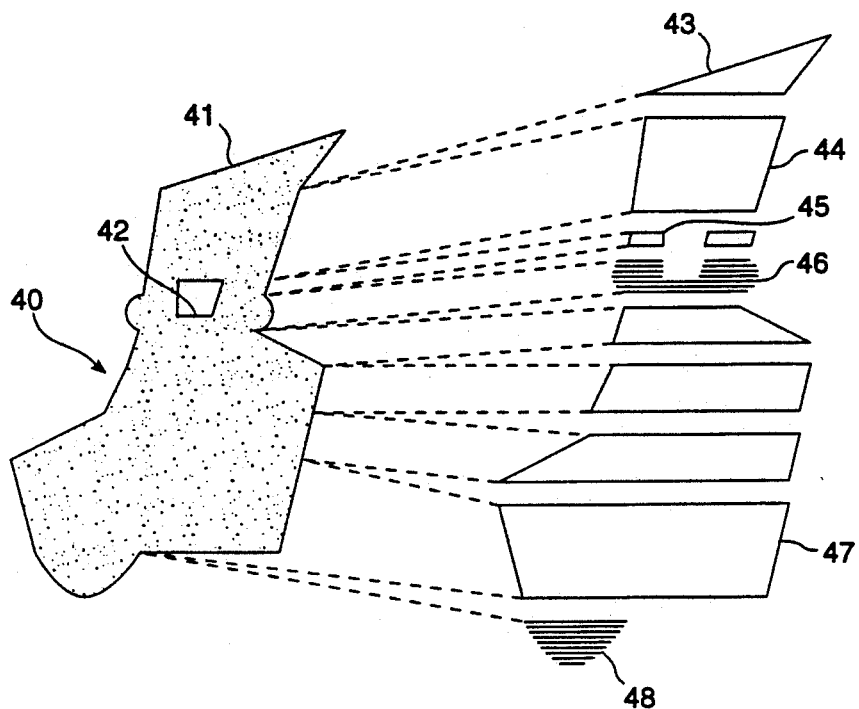
FIG. 3 illustrates an arbitrary region divided into trapezoids.

Using the PostScript system, a filled region is divided into graphic primitives and these primitives are displayed as output. FIG. 3 illustrates an arbitrary region 40 bounded by outlines 41 and 42. An outline can be described generally as a series of lines or curves defining the edge of a region to be displayed. The resolution of the lines or curves can be selected to be lower for a relatively low-resolution display and higher to render finer details. The image of each filled region to be rendered can be divided into segments, e.g., horizontal segments, bounded by essentially straight edges of an outline to make trapezoids, run-arrays or other appropriate geometric figures in order to build a complete region.

The use of trapezoids as a basic primitive is particularly useful for a raster display device which builds an output region by tracing horizontal scan lines. The trapezoids are preferably oriented with their parallel sides in the direction of the scan lines. Referring to FIG. 3, portions of a region can be rendered as a plurality of trapezoids, e.g. trapezoids 43, 44, 45, and 47. Details can be rendered using one or more single scan lines, e.g. scan lines 46, 48. A series of scan line segments can be stored as a run-array for more convenient storage and handling. A run-array is simply an array or assembly of runs specified, for example, by the starting point and length of each included run. A PostScript processor converts information about trapezoids into an output region on or for a raster marking engine, typically in the form of a complete bit map of the output region. A typical PostScript processor useful in conjunction with the system and method of this invention prepares each scan line for output, determining one or more ranges of pixels on that scan line which should comprise the output.

Graphical operations in the preferred embodiment include trapezoid filling, run-array filling, mask filling and source image operations. Source image operations include imaging with trapezoid or with run-array based device regions. In a preferred embodiment, all of the commands and parameters required to render the primitives are passed in a main memory-based data structure called a display list. The format of this display list and a description of the detailed operation of representative commands is described below.

In a preferred embodiment, GCP 10 includes a plurality of registers for storing needed values. These values may include reference points, e.g., the memory location for the start of device coordinate space, the first memory location in the band currently being rendered, certain pixel coordinates, the scan line currently being rendered and other pieces of information. GCP 10 also includes a plurality of state machines designed to carry out specific tasks depending on the inputs to each state machine.

In a preferred embodiment, data or commands are assumed to start on a 32-bit boundary in main memory. Data types include main memory addresses, integers, device pixel coordinates, pointers, character masks, compressed character masks and display list operator op-codes. Certain fields are undefined and should be set to zero by the host CPU. Pixel coordinates can be absolute coordinates in device coordinate space relative to the start address of device coordinate space in memory. That start address is loaded into a register prior to commencing imaging operations. Integer pixel coordinates refer to the lower left corner of the idealized device pixel in question, while fixed point pixel coordinates can refer to any point within the device pixel. Fixed point pixel coordinates can be represented in the familiar 16-bit whole plus 16-bit fractional coordinate fashion. One skilled in the art will recognize additional and alternative data structures and sizes which can be used with the system and method of this invention.

The base address of the device coordinate space is stored in a device coordinate base (DCB) register. Since the appropriate marking engine using the output of the present device will typically be a high resolution band device where less than the entire device coordinate space buffer will be present in main memory simultaneously, the DCB register will frequently contain a negative twos-complement number, such that the pixel addressing calculations which are performed produce addresses within the current band buffer in memory. Also, since many marking engines have a device coordinate space with greater than $2^{16}$ pixels along one or more dimensions, the DCB register may optionally be biased to a point or location well within the device coordinate space. The use of biased addresses within the DCB register is supported in the preferred embodiment to achieve "extended addressing" within the device coordinate space.

The present invention is particularly useful for four types of imaging and graphics rendering work in a high-performance RIP environment:

1) screening for "halftoning" of scanned photographic images;
2) area filling with color or gray scale levels which require screening;
3) area filling with all white or all black values (typically lines); and
4) rendering under a mask (typically character bitmaps).

Although the host CPU in the intended environment will preferably be a fast processor capable of doing area filling of all white or all black at nearly main memory bandwidths, there can be additional RIP system level performance improvement by allowing the system and method of this invention to perform filling operations independently of the host. This co-processor architecture permits the host to perform display list processing, PostScript language program processing, disk file I/O processing or other tasks while the display list is being rendered by the system of this invention for a given band buffer.

When filling regions with gray scale or color levels that must be screened, the system and method of this invention has a decided advantage over host-based filling due to the complexity of most screening methods. Traditionally, filled regions which require a single gray level can be filled more rapidly by precomputing a "gray brick" or small pattern of pixels which is based on the current gray-level setting screened against the current screen. For example, a 50% gray could consist of alternating white and black pixels, while a 90% gray would have an average of 1 in 10 pixels (in two dimensions) white. The brick is used to "tile" the device address space with a simple repeating pattern of bits which represent the device pixels to be turned on at a fixed gray level during halftoning. Since the gray level is fixed, most of the thresholding computation can be eliminated by performing this function for one or a small number of halftone cells only, then replicating the bit-map so obtained when filling the region in question. In modern, sophisticated halftone tile screening methods, unlike more primitive rational screening approaches, it is generally not possible to determine a simple, repeating pattern of zeroes and ones of limited size (typically 64 Kbytes or less). This is because some screens are rotated by angles which cause the periodicity of any pattern across a given scan line to be tens or hundreds of scan-units long. A scan unit is a computer word corresponding to one or more source image or output region device pixels and is usually the size of the host processor's native word size.

The filling method must individually determine the screen threshold comparison result for each device pixel. Even if the periodicity of the gray pattern were significantly smaller than the imageable area, the computation of a "gray brick" can still be prohibitively slow in comparison to the ordinary screening approach when using the system and method of this invention. This is because the speed with which the halftoning process proceeds using GCP 10 is limited only by main memory bandwidth.

Organizational Design Optimization

The present invention is designed to offer maximum performance in a somewhat special controller environment and for a range of high-resolution marking engine types. Additionally, the target design of the present invention is optimized for the most frequent types of graphical or imaging operations and their most common parameters.

In other environments, the system of the invention also offers improved performance relative to prior art devices but not as dramatic as GCP 10 performance under ideal conditions. If, for example, a rotated image is presented, source image samples must be obtained, which requires the time and expense of calculating main memory addresses for each block of three or four device pixels rendered, assuming typical source and destination resolutions. The additional memory overhead required to stall instruction pipeline in GCP 10 for each calculation can result in a reduction of imaging performance by a factor of two or more.

Theory of Operation

Major Functional Units and Data Paths

Figure 2:
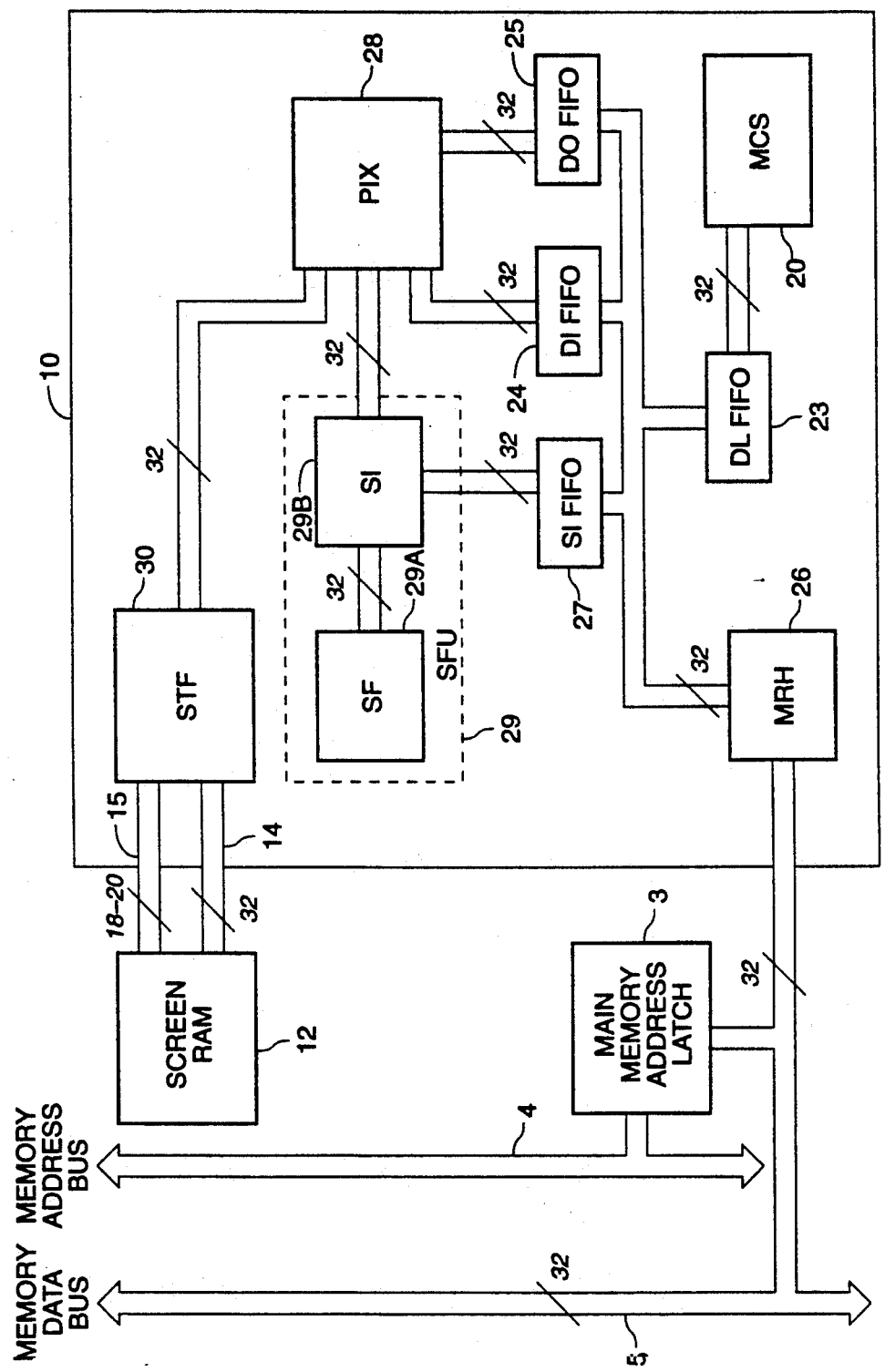
FIG. 2 illustrates the principal components of a preferred embodiment of this invention.

In a preferred embodiment, GCP 10 is divided into the following major functional units, most of which operate as independent state machines which can function in parallel to render or calculate various portions of a region. Most of the major functional units are tied to an internal bus. These functional units and interconnections are illustrated in FIG. 2.

| Unit Identifier | Function |
| --- | --- |
| STF 30 | Screen Threshold Fetcher |
| SF 29A | Source Fetcher |
| SI 29B | Source Input |
| SFU 29 | Source Fetcher Unit |
| PIX 28 | Pixel Assembler |
| MCS 20 | Main Control Sequencer |
| MRH 26 | Memory Request Handler |
| DL FIFO 23 | Display List First-In First-Out (FIFO) Buffer |
| DI FIFO 24 | Destination Input FIFO |
| DO FIFO 25 | Destination Output FIFO |
| SI FIFO 27 | Source Input FIFO |
| Screen RAM 12 | |

Each of the functional units serves to provide an additional degree of parallelism in the graphics rendering process as well as to isolate the addressing structure of the buffer or memory area being served by the state machine in question. Functional units operate in parallel, advancing one state per clock cycle, with communication signals used between units to synchronize the operations. Each functional unit is designed such that a memory buffer for that unit is included only if needed and is directly associated with that functional unit, providing a simpler design for that unit in most cases.

GCP 10 was built as a single chip using standard, commercially available cell libraries, selected and interconnected to give the desired functionality. The chip was manufactured at VLSI Technology in San Jose, Calif. The masks used to make GCP 10 are being registered for mask work protection contemporaneously with the filing of this application. Those masks are incorporated herein by reference and a copy of the registration information forms the Appendix to this specification. One skilled in the art and having access to standard cell libraries can implement the system of this invention without reference to those masks.

GCP 10 can render simultaneously four device pixels, when performing a gray fill or image operation, on each clock cycle. At a clock rate of 25 MHz, therefore, an overall rate of up to 100 million pixels/second are rendered into the device frame or band buffer in main memory. With optimal display list primitives organized as large objects of significant length in the scan-line direction, this rate of rendering was actually achieved for sufficient periods of time such that the overall rendering rate for typical display lists approached 80 million pixels/second.

To provide this kind of performance, GCP 10 performs many operations in parallel during each clock cycle—a benefit of functional unit parallelism through pipeline design techniques. While rendering a given primitive, the actual pixel-by-pixel processing in each stage of the pipeline is handled by a series of "hardwired" state machines so that the rendering rate of four pixels per clock is achieved during the majority of the time.

Display List

In a preferred embodiment, the primary input to GCP 10 is a display list which includes information about source images, regions, selected fill characteristics and character shapes, specifically run-arrays, trapezoids and masks. The display list is preferably already calculated for a selected marking engine. Thus the system of the invention is responsible only for converting the display list to a bit mapped output in memory at a selected resolution. For example, a certain display list could be calculated by CPU 11 (FIG. 1) for a target marking engine, for example, a video screen with a display of 1024×1024 pixels at 72 dpi. A related but different display list might be useful for outputting essentially the same output to a high-resolution printer, e.g., one capable of filling white space with selected black dots at a selected resolution, say 1200 dpi. A typical display list will include a plurality of operation codes (op codes) and the relevant parameters required by each op code.

In a preferred embodiment, a display list is prepared in blocks of a certain size, for example 1 Kbyte, with links to subsequent blocks as needed. Display lists can include subroutines, e.g. for fill patterns, with subroutine return commands back to the point of departure in a parent display list. In another preferred embodiment, multiple levels of subroutines are implemented.

One useful op code is a FillTrap instruction, which is used to fill trapezoids. A trapezoid is described geometrically by four points connected along a perimeter. In practice, trapezoids are preferably calculated with two horizontal edges and two sloping edges. The number of horizontal scan lines to be rendered depends on the trapezoid to be rendered and may vary from a very small number, for example where a source image or filled region is very small, to a very large number, for example if a large, regular geometric figure is to be displayed at high resolution. In a preferred embodiment, the FillTrap op code includes coordinates of a lower horizontal edge, an upper horizontal edge and starting and ending points along each of the lower and upper horizontal edges. The instruction can also include information about the slope of each of the angled edges, preferably pre-calculated, to avoid calculating the slope at the time of rendering.

In GCP 10, the interior and edges of the trapezoid are filled with a preselected white, black or gray level or even with a screened source image such as a scanned image. The fill characteristics can be specified in the data associated with the op code, or, alternatively, can be maintained in a memory location.

Additional op codes may be defined for the special cases of imaging parallelograms or trapezoids with one or more vertical edges, although one skilled in the art will recognize that there is a trade off between a large, powerful set of instructions and a small, fast set of instructions.

Another op code is a RunArrayFill instruction. This instruction includes information about the dimensions of the array, which in turn contains information about multiple horizontal regions along selected lines which should be filled. For example, the information may include a lower and upper bound of included scan lines followed by information for each scan line, including the number of horizontal regions on that line to be filled and the starting and ending points of each such horizontal region.

One skilled in the art will recognize that a number of other op codes can be useful in the display list. These op codes can include various modes of accessing selected registers which the designer chooses to implement, information about tasks or images or other information required to display a region. Some useful opcodes include instructions to select a region from a designated memory location or create a region using specified coordinates. Other opcodes include instructions to: fill a region with a halftone screen with a specified gray level; fill a region with at least one halftone screen with a specified color; fill a region using black pixels; fill a region using white pixels; fill a region using opaque pixels; and fill a region using a mask, where the mask can be found in a designated location in memory or can be generated using predetermined information. Still other opcodes are useful for manipulating or using source images and include instructions to: define a source image; scale a source image; rotate a source image; shear a source image; flip a source image; clip a source image; define an image mask; and fill a region with an image.

Main Control Sequencer (MCS)

Referring to FIG. 2, MCS 20 is a central controlling unit for the entire system and coordinates the chip function, assigning tasks to the appropriate processing unit. In a preferred embodiment, MCS 20 is responsible for all operations that require intelligent but infrequent intervention. MCS 20 is organized around a programmable, microcoded sequencer and is assisted by a general purpose arithmetic logic unit (ALU).

In a preferred embodiment, MCS 20 controls whether the system will be in a slave or master mode. GCP 10 powers up in slave mode. MCS 20 recognizes when an external device (external to GCP 10) such as the host CPU is seeking the attention of the system of this invention, for example, to load registers of the system or to begin rendering a region. The external device can then set status bits and control registers and perform any other initialization that is required. The external device can send a starting memory address to MCS 20 via a bus or otherwise. MCS 20 then accesses that memory location and transfers some number of bytes of information into a buffer for further processing. Typical information is in the form of a display list, described above. A typical display list may contain initialization information as well.

When GCP 10 is instructed to begin rendering a region, GCP 10 goes into master mode and controls one or more external buses, such as the main address bus and main data bus, as needed to access display list and memory information. In alternative embodiments, GCP 10 may use one or more external buses for transferring source image or output region information. MCS 20 also manages the exchange of information internally between various registers and storage areas within or closely associated with GCP 10.

Display List FIFO (DL FIFO) 23 is connected to an internal bus of GCP 10 and is controlled by MCS 20. DL FIFO 23 is a memory buffer, preferably configured to hold 16 or more words. When instructed, or as needed, MCS 20 loads a display list into DL FIFO 23. MCS 20 then analyzes the display list, parses each instruction into an op code and its associated operands and then passes the instruction or relevant information to the appropriate unit of GCP 10 for subsequent processing. MCS 20 can read subsequent display list instructions and can act on them or pass them to the appropriate unit of GCP 10. It is possible and, in fact, desirable for each unit of GCP 10 to be processing information in parallel whenever possible in order to render a region more quickly.

MCS 20 provides data and sets registers for necessary memory accesses and other support functions as described below. For example, if MCS 20 encounters a FillTrap instruction, it will find the device pixel address for the first point to be rendered in the trapezoid (scan line and position on the scan line) and then load the coordinates of that pixel address into registers. The FillTrap display list instruction also includes the location of the correct ending pixel to be displayed on a scan line and, preferably, MCS 20 calculates the number of intervening pixels along a given scan line and loads that information into registers. MCS 20 also calculates the next set of register parameters, for example, the starting and ending pixel for the next scan line or region or the starting pixel and number of pixels to be rendered and keeps them in "phantom" registers until they can be moved to other units of GCP 10 for subsequent processing. The appropriate unit of GCP 10 can copy the contents of these phantom registers when the information is needed. MCS 20 typically does not know when the phantom registers will be read so it calculates and stores the next value for the phantom registers. When another unit of GCP 10 (usually PIX 28) accesses those registers, it also signals MCS 20 so that the phantom registers can be updated. Using this technique, most register updates can be pipelined.

In a preferred embodiment, MCS 20 finishes one trapezoid before handling the next trapezoid in a display list. Some operations during processing of a trapezoid may require interlock within GCP 10 in order that various units of GCP 10 properly complete their respective operations. Interlock is handled by the various state machines in GCP 10, with different lock and unlock schemes for different timing situations. Several methods of implementing interlock are well known to one skilled in the art.

DL FIFO 23 is kept current by MCS 20 and filled as needed by memory request handler (MRH) 26. MCS 20 keeps track of what is in DL FIFO 23, what information is valid and when the buffer should be flushed or refilled through the use of special hardware. In a preferred embodiment, MCS 20 or MRH 26 does these transfers using an external bus in burst or page mode, which allows more efficient utilization of the bus. Logic in MRH 26 controls how much and what information to get from external memory. The steps basically include identifying a relevant memory address which contains a pixel or a first display list instruction of interest, getting the data, typically by direct memory access over an external bus and loading that data into the appropriate FIFO.

Whenever the normal course of rendering a primitive object is interrupted by a boundary condition, MCS 20 generally intervenes to handle the condition, then rendering resumes at hardware speed. Examples of these boundary conditions include the start of a new row of source image pixel samples, whereupon MCS 20 calculates memory addresses for the start of a new row and increments the current row number. Another boundary condition occurs when the current rendering operation reaches the end of the current row in the current screen, whereupon MCS 20 calculates the starting screen tile number, row number and starting pixel position within the screen tile. MCS 20, PIX 28 or another GCP unit handles the condition involved and inserts the required new data or address information into the appropriate hardware registers. Frequent boundary conditions, such as the overflow of source image data from one 32-bit source word to the next sequential word, are handled directly by the state machines involved. Therefore the performance of MCS 20 is not generally a significant factor in overall rendering performance.

Output Rendering

The principal GCP rendering components are destination input FIFO (DI FIFO) 24, destination output FIFO (DO FIFO) 25 and pixel assembler (PIX) 28. This unit of GCP 10 fills a selected region with a selected fill or source image. The FIFOs are memory devices, preferably high speed, connected to an internal bus of GCP 10. Memory request handler (MRH) 26 maintains the FIFOs, keeping input FIFO DI FIFO 24 close to full (same for DL FIFO 23) and output FIFO DO FIFO 25 nearly empty. PIX 28 is a state machine and includes associated devices for loading data into comparators and outputting device pixels.

DI FIFO 24 is used to hold pre-existing output band or frame buffer data, if any, for a unit of the band or frame. Generally pixels are stored in external memory and accessed in a page mode DMA transfer, but other forms of memory or transfers can be used. In a preferred embodiment, all bits in a band buffer are set to a selected initial state rather than starting with random state. For example, all bits in the buffer can be set to the background print color, often white. MCS 20 instructs MRH 26 to fill DL FIFO 24 with data from memory for pixels of interest for a pending operation. In some instances, it is sufficient to load only starting and ending pixels of a scan line region into FIFO 24. This can be useful, for example, when a region is to be filled with all black or all white device pixels and any intervening, pre-existing information is irrelevant.

MCS 20 passes an op code or display list instruction to PIX 28, including coordinates and information about the selected fill operation. Display list instructions or fill instructions can instruct PIX 28 to "fill opaque," that is, fill a selected output region with opaque, e.g., white or black pixels or a selected gray or halftone source image, thereby covering up any previous source image information. Alternatively, PIX 28 may "fill with mask," that is, test the current black, white or gray fill against a mask. Where the mask includes an empty portion, any pre-existing source image information for that portion will be unchanged, thereby allowing selected portions of a pre-existing source image or output region to show through the current fill.

PIX 28 fills a selected scan line in a region from the selected starting pixel through the selected ending pixel with the selected mask or fill. Note that some regions may include a small number of pixels that fall entirely within a single scan unit (a computer word corresponding to multiple output region pixels). In simple cases of painting opaque black or white, a relatively large number of pixels (32 in a preferred embodiment) can be filled on each clock cycle.

PIX 28 outputs the relevant pixels to DO FIFO 25. PIX 28 and MRH 26 also manage DO FIFO 25 and copy the contents of DO FIFO 25 to external memory, e.g. a band buffer, as appropriate. DI FIFO 24 and DO FIFO 25 are usually flushed at the end of each scan line.

Screen Threshold Fetcher Operation

Figure 4:
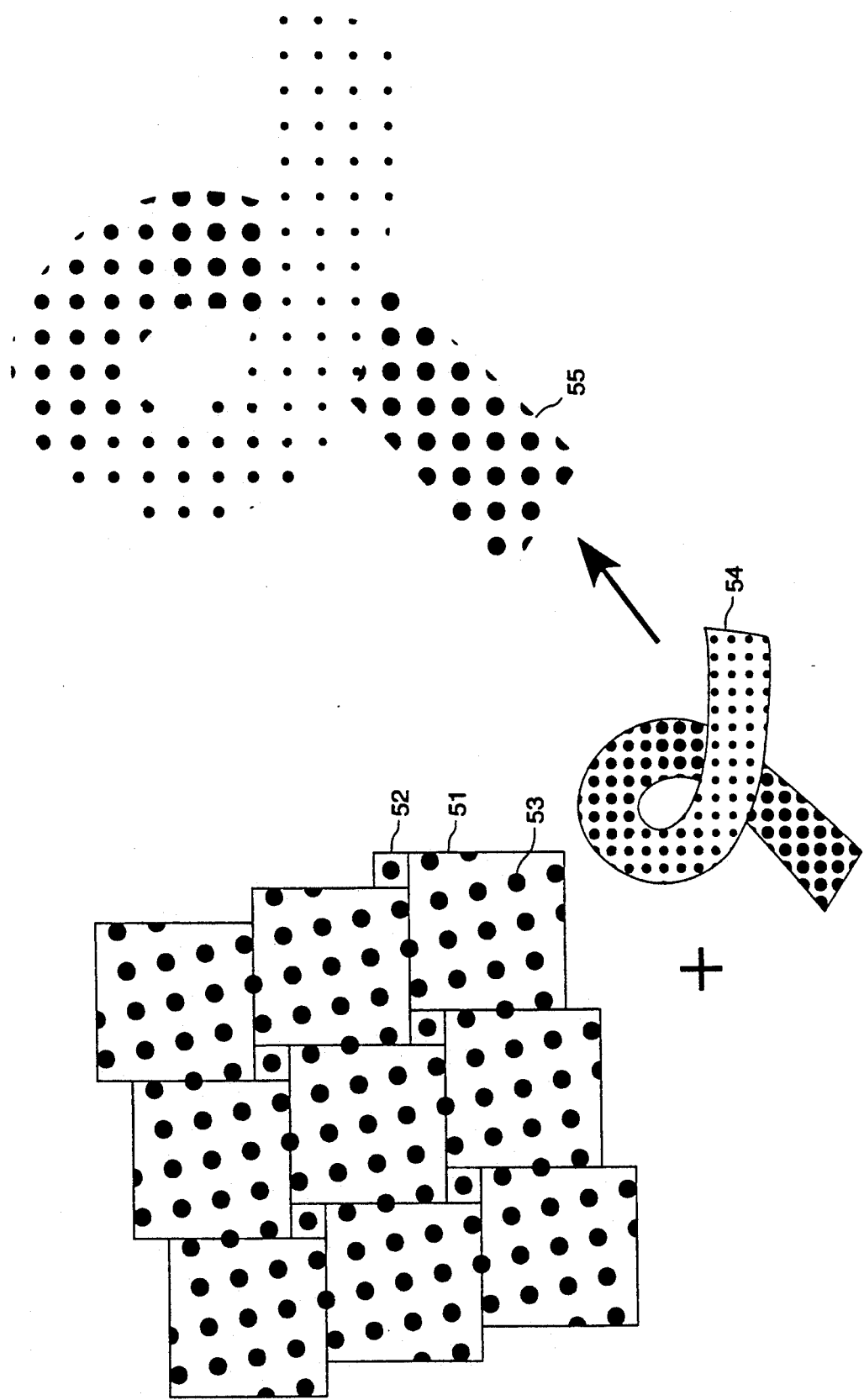
FIG. 4 illustrates one embodiment of halftone screen tiles used to display an arbitrary region.

PIX 28 includes a threshold comparator which is invoked when the fill is gray or an image halftone pattern. Referring to FIG. 4, a region 54 to be scaled and filled with one or more gray levels is rendered as a series of halftone cells 53 computed using threshold array data from screen RAM 12. The threshold comparator in PIX 28 tests each pixel in the source image (source pixel) against a geometrically corresponding value in the threshold array and outputs a device pixel of a first binary value if the source pixel value exceeds the threshold value and otherwise outputs a device pixel of the other binary value, thereby filling a region, e.g. region 55.

The theory of one type of such screening is described in co-pending application Ser. No. 434,924, discussed above. This method is particularly useful for halftone or screen applications. In brief, a "Utah tile" is a "supertile" which itself is typically a series of smaller tiles. A typical Utah tile will contain several halftone cells in an "A" rectangle, e.g. rectangle 51, and a "B" rectangle, e.g. rectangle 52. GCP 10 can use other threshold arrays as well. A threshold array can be precalculated and stored, generally as a relatively smoothly varying function with a period equal to the spacing of a desired halftone screen.

When MCS 20 interprets an op code requiring screening, it activates screen threshold fetcher (STF) 30. MCS 20 identifies which pixel in a threshold array corresponds to a starting pixel in the source image or filled region. The threshold array is stored in a high-speed halftoning RAM, screen RAM 12. STF 30 identifies the appropriate starting address in screen RAM 12 and initiates the transfer of data to PIX 28. In a preferred embodiment, the halftone threshold array consists of a series of 8-bit values and the data path is 32 bits wide. Thus, threshold values for four output pixels can be delivered on every clock cycle. STF 30 determines when the edge of a threshold array scan line is reached, as well as what corresponding threshold address should be used for the next source pixel comparison. STF 30 can signal the comparator to wait until valid threshold data is available on the bus. A new threshold scan line can be delivered in two clock cycles.

STF 30 is also responsible for aligning data when the edge of a threshold array is not on a word boundary. PostScript maintains absolute screen phase (relative to the origin) for all objects on a given page. This allows objects to align with each other seamlessly and, more importantly, allows portions of a region to be rendered separately from other portions of the same region to give a seamless final output. Some display models, such as Hewlett Packard's PCL and Macintosh ® Quickdraw, do not maintain absolute screen phase, although others do. STF 30 aligns the pixels of a region to be rendered according to the correct screen phase and corresponding starting point in the screen threshold array. PIX 28 generates multiple bits (a nibble) that are nibble-aligned within DO FIFO 25, e.g. 4 bits in a nibble, aligned as a destination word. Each bit of the nibble is generated from a comparator which requires an 8-bit threshold value. STF 30 uses a byte shifter to allow each byte of threshold data input from screen RAM 12 to be shifted to the appropriate comparator. PIX 28 can then use the pre-aligned, shifted threshold word. STF 30 also performs realignment when the end of a threshold line is reached and a new threshold line is fetched.

Using this mechanism, an area can be filled with an evenly screened gray level. A preset gray level can be stored in a register and compared against each threshold pixel value, aligning scan lines as before. If the gray level is less than the threshold level, the output pixel will be marked black. If the gray level is equal to zero (dark), each output pixel is marked black. If the gray level is equal to FF (light), each output pixel is marked white. One skilled in the art will recognize how to choose dark versus light colors on the appropriate output device and can utilize this method accordingly. In a preferred embodiment, GCP 10 can be set to output either "white" or "black" when an output pixel is a logical 1. Thus by simply changing one flag, an entire region or portion of a region can be reversed black for white or vice versa.

In a preferred embodiment, PIX 28 has multiple, e.g. four, comparator units, one for each of the pixels which can be compared in a single clock cycle. Source and threshold pixels are shifted and masked as appropriate, depending on the instruction being implemented. The resulting value is also shifted as required for the device coordinate space and rendered into DO FIFO 25. The comparator can keep track of both left and right edges, which correspond to a first and a last scan unit of a region being rendered.

A bilevel output device has no gray scale capability and can only display "black" or "white." PIX 28 outputs four comparisons per cycle, thus 8 cycles are required to fill a single scan unit in DO FIFO 25 (8 cycles×4 pixels=one 32-bit word). When a region is filled with a vertical blend or gradually changing gray or color level, the display list can encode the region as a number of thin trapezoids, each with an appropriate gray level.

Masking

Masks can be useful for rendering certain regions, in particular characters or text. A typical character is defined or represented by an outline. At the time of rendering, the character outline usually already has been converted to a bitmap at the appropriate resolution and size required for output and stored in memory. A typical display list instruction for a character will simply specify the starting memory coordinates for the character mask and the starting coordinate in device coordinate space where the character is to be placed. In a preferred embodiment, MCS 20 gets the needed information from external memory and places the mask into source image FIFO (SI FIFO) 27.

Sometimes a mask may be clipped for use in rendering a portion of the output. The clipping path may be linear, for example a sheer left edge, or may follow an arbitrary path, as in the case of an image mask. This method is most useful with a non-clipped and non-compressed mask. A mask which has been compressed, for example, by using run length encoding, should preferably be uncompressed and placed into a portion of memory so as to be accessible in non-compressed form. For example, using typical memory configurations, approximately 256 scan lines are rendered in a band buffer before being transferred to a marking engine. For a high resolution typesetter with a resolution of 2400 dpi, this corresponds to only 0.1 inch, which is less than the height of a typical capital letter. Thus a typical line of text will cross more than one band. GCP 10 allows clipping "on the fly" for characters, e.g. taking only a certain vertical range of a character mask for rendering a particular band. Alternatively, one could use an expanded display list to render the lower third of a line of text, for example, followed by the middle third and top third.

The entire mask is read into SI FIFO 27. It is then aligned bit by bit with the device buffer output as a function of the leftmost x-value on the starting scan line. A typical fill will "fill under mask," in which case the appropriate scan unit from DI FIFO 24 must be aligned and merged with the input mask.

One preferred embodiment includes a special operator, a RenderImageMask instruction, which renders one device pixel per source pixel. This can be treated or processed like a mask but the pixel assembler can assemble 32 bits per clock cycle if the current fill color is black or white.

Source Fetcher Unit (SFU)

SFU 29 provides a mapping from a source image in an arbitrary coordinate space (source image space) to device coordinate space. The mapping is frequently non-scalar and device resolution is usually greater than source image resolution. Mapping may also be one to one or to device resolution less than source image resolution, but the current method is most beneficial when device resolution is greater than source image resolution. One common example is a device output of 2400 dpi for a source input of 300 dpi. In a preferred embodiment, GCP 10 makes special provision for three special cases: a unit scalar and 0° rotation, in which the source image is simply treated as a mask; a 0° rotation, that is, no rotation but rendered at an arbitrary scale and arbitrary rotation (e.g. 15°) at an arbitrary scale.

For the special case of 0° rotation and arbitrary scale, GCP 10 can keep SI FIFO 27 full because the incoming data is, by definition, consecutive and the output region can be prepared portion by portion. MCS 20 does not need to keep track of which output pixels are being rendered. It is sufficient to instruct PIX 28 where to find a source pixel in SI FIFO 27. A register can be set aside as a source address pointer which can be incremented as each source pixel is rendered. A typical source image may have 8 bits per pixel per channel (256 level gray scale per color component in color separations).

Figure 5:
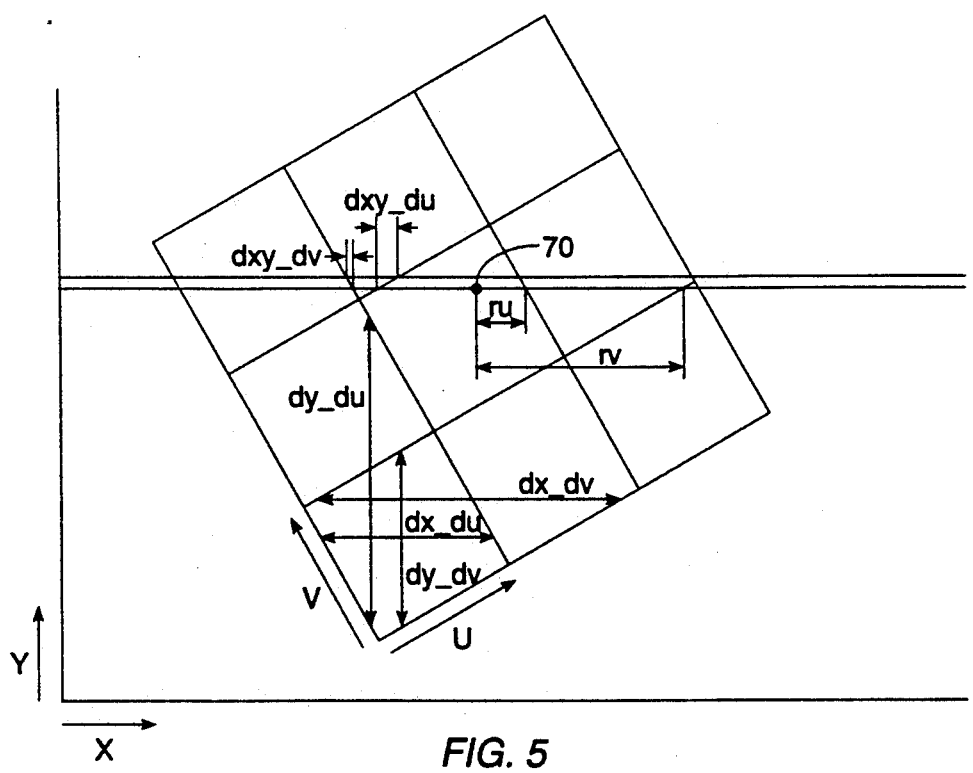
FIG. 5 illustrates an angled source image and the conversion from source pixels to device pixels.

Referring to FIG. 5, U and V are unit vectors in source image space and X and Y are unit vectors in device coordinate space. For unit vectors U and V rotated some angle from unit vectors X and Y, distances dx_du and dx_dv (delta x over delta u and delta v, respectively) can be determined easily.

Traditional PostScript devices start with a selected device or output pixel and look for the corresponding source pixel or pixels. Rendering a large number of device pixels per source pixel requires calculation of small differences in source pixel coordinates, sometimes leading to mathematical inaccuracies and an accumulating error. In prior art implementations, increasing the output device resolution increased the potential for error.

GCP 10 (FIG. 2), in contrast, starts with a source pixel and calculates an increment vector to render corresponding device pixels. The result is independent of scale. The increment vector can be quite accurate and can even be implemented using double precision numbers. Using the system and method of this invention increases output image resolution and allows more accurate rendering of a source image.

Image Fetch Method

An image as defined by PostScript has an arbitrary scaling and rotation with respect to the device coordinate space of the rendering hardware. This scaling and rotation is achieved by matrix transformation using matrix multiplication. A given point in device coordinate space (x, y) can be translated into a point in source image space (u, v) by the following matrix multiplication:

$$\begin{bmatrix} a & b & 0 \\ c & d & 0 \\ tx & ty & 1 \end{bmatrix} \cdot \begin{bmatrix} x \\ y \\ 1 \end{bmatrix} = \begin{bmatrix} u \\ v \\ 1 \end{bmatrix}$$

This matrix multiplication yields the following equations:

$$u = ax + cy + tx$$

$$v = bx + dy + ty$$

The matrix [a b c d tx ty] which defines the values for device coordinate space is available internally inside GCP 10. These values are floating point numbers that are converted into 32-bit fixed point representation for use by the image rendering method. A 32-bit fixed point value uses 16 bits to represent the whole number portion and 16 bits to represent the fractional part.

The description of the image to be rendered (including the above transformation matrix) along with a graphic object (or objects) in device coordinate space is passed to the image rendering section. This graphic object defines a series of line segments to be rendered, oriented in the scan line direction. A line segment can be described as a line between two points (xl, y) and (xg, y), where xl is the minimum (lower) x value along a selected scan line and xg is the maximum (greater) x value on that scan line. The two points have the same y value. A graphic object usually has multiple line segments and each line segment may have different y, xl and xg values.

Prior Art Method

One image rendering method is performed as follows for each graphic object.

1. Transform initial point (xl, y) to (u, v).
   Save (xl, y) as (oldX, oldY).
2. Save integer portion (IntPart( )) of (u, v) to (oldU, oldV).

Use (oldU, oldV) to calculate initial pointer to image data.
3. For each new line segment (xl, y)
   (deltaX, deltaY) = (xl − oldX, y − oldY)
   (u, v) = (oldU + a*deltaX + c*deltaY, oldV + b*deltaX + d*deltaY)
   if IntPart (u) != oldU, adjust image pointer
       oldU = IntPart (u)
       if IntPart (v) != oldV, adjust image pointer
           oldV = IntPart (v)
   (oldX, oldY) = (x, y)
4. For rest of pixels in line segment (xl, y) −> (xg, y)
   (deltax, deltaY) = (1, 0) by definition
   (u, v) = (oldU + a, oldV + b)
   if IntPart(u) != oldU, adjust image pointer
       oldU = IntPart(u)
   If IntPart (v) != oldV, adjust image pointer
       oldV = IntPart(v)
   (oldX, oldY) = (x, y)

This prior art method can be used for any transformation matrix. However for the most common case where there is no rotation, the values of b and c are 0 and the above method is further optimized.

Method of this Invention

The prior art method requires recalculation of (u, v) for each device pixel. GCP 10 is capable of rendering multiple pixels through a halftone threshold screen, so a new method was developed to avoid calculating (u, v) coordinates of each device pixel. For each source image pixel, this new method determines how many device pixels can be rendered using the same source image coordinates. It also determines what the next (u, v) source image pixel will be. With this new method, when a source image pixel maps onto multiple device pixels due to the image scale, each iteration produces data used to render multiple device pixels. This allows GCP 10 to render multiple device pixels per device iteration.

The method of this invention calculates several variables for each image which are constant for each unique image. Referring to FIG. 5, dx_du = 1/a  Number of device pixels in the scan line direction (x) between horizontal (u) image pixels
dx_dv = 1/b  Number of device pixels in the scan line direction (x) between vertical (v) image pixels
dy_du = 1/c  Number of device pixels in the vertical direction (y) between horizontal (u) image pixels
dy_dv = 1/d  Number of device pixels in the vertical direction (y) between vertical (v) image pixels
dxy_du = dx_du/dy_du = c/a  shift in scan line distance to the next horizontal image pixel (u) when moving one device pixel in the vertical direction (y)
dxy_dv = dx_dv/dy_dv = d/b  shift in scan line distance to the next vertical image pixel (v) when moving one device pixel in the vertical direction (y)

Note that when a, b, c or d are zero (true with orthogonal images), certain variables become infinite and cannot be calculated. A modified method detailed below is used for these cases and for all rotated cases.

Non-Orthogonal Rotation

GCP 10 follows this method for each graphic object and for all rotated images.

0. Calculate  dx_du = Fix (1.0/a);
              dx_dv = Fix (1.0/b);
              dxy_du = Fix (c/a);
              dxy_dv = Fix (d/b);

-continued

This is done only once per image
1. Transform initial point (xl, y) (70 in FIG. 5) to (u, v) in floating point.
   Convert (u, v) to fixed point.
      Use IntPart (u), IntPart (v) to calculate initial pointer to image data.
   Calculate ru, rv as follows:
   ru = −dx_du * FracPart (u)
   if (ru < 0)
      (only if dx_du > 0 and FracPart (u) !=0)
      ru += dx_du;
      ru is the remaining scan line distance in device pixels to the next horizonal (u) image pixel
   rv = −dx_dv * FracPart (v)
   if (rv < 0)
      (only if dx_dv > 0 and FracPart (v) !=0)
      rv += dx_dv;
      rv is the remaining scan line distance in device pixels to the next vertical (v) image pixel
   (oldX, oldY) = (x, y)
   (oldRu, oldRv) = (ru, rv)
   oldPointer = pointer
   go to step 3
2. For each new line segment (xl, y) −> (xg, y)
   (deltaX, deltaY) = (xl − oldX, y − oldY)
   (ru, rv) = (oldRu, oldRv) −
      (deltaX + dxy_du*deltaY, deltaX + dxy_dv*deltaY)
   pointer = oldPointer
   while (ru < 0)
      ru = ru + |dx_du|
      pointer = pointer +
         (sign(dx_du) * size (image pixel))
   while (ru >= |dx_du|)
      ru = ru − |dx_du|
      pointer = pointer −
         (sign (dx_du) * size (image pixel))
   while (rv < 0)
      rv = rv + |dx_dv|
      pointer = pointer +
         (sign(dx_dv) + width of image)
   while (rv >= |dx_dv|)
      rv = rv − |dx_dv|
      pointer = pointer −
         (sign(dx_dv) * width of image)
   (oldx, oldY) = (x, y)
   (oldRu, oldRv) = (ru, rv)
   oldPointer = pointer
3. For each line segment (xl, y) −> (xg, y)
   (E.g., when the distance is 5.xx pixels, increment ru and rv by 1 to allow generation of 6 pixels)
   (ru, rv) = (ru, rv) + (Fix(1), Fix (1))
   len = xg − xl
   while (len > 0)
      imglen = min(IntPart(ru), IntPart(rv))
      if (imglen != 0), render image at pointer for len imglen
      len = len − imglen
      (ru, rv) = (ru, rv) − (Fix(imglen), Fix(imglen))
      if (ru < Fix (1)),
         we have crossed a horizontal (u) image pixel
         ru = ru + |dx_du|
         pointer = pointer +
            (sign(dx_du) * size (image pixel))
      if (rv < Fix (1)),
         we have crossed a vertical (v) image pixel
         rv = rv + |dx_dv|
         pointer = pointer +
            (sign(dx_dv) * width of image)

Orthogonal Rotation

When dealing with an orthogonal image (0, 90, 180 or 270 degrees rotation), the variables a or b will be zero. If both are zero, the image to be rendered has no width in the scan line direction. If b and d are zero, the image to be rendered has no height. Both of these cases are illegal and should not be rendered.

The following method has been modified for when b is zero (the 0 or 180 degree rotated case). A similar method can be used when a is zero (the 90 or 270 degree case).

0. Calculate
      dx_du = Fix(1.0/a);
      dy_dv = Fix(1.0/d);
      dxy_du = Fix(c/a);
   This is done only once per image.
1. Transform initial point (xl, y) to u, v).
      Use IntPart(u), IntPart(v) to calculate initial pointer to image data.
      Calculate ru, rv as follows
      ru = −dx_du * FracPart(u)
      if (ru < 0)
         (only if dx_du > 0 and FracPart (u) != 0)
         ru += dx_du;
         ru is the remaining scan line distance in device pixels to the next horizontal (u) image pixel
      rv = −dy_dv * FracPart(v)
      if (rv < 0)
         (only if dy_dv > 0 and FracPart (v) != 0)
         rv += dy_dv;
         rv is the remaining vertical (90° to scan line) distance in device pixels to the next vertical (v) image pixel
      (oldX, oldY) = (x, y)
      (oldRu, oldRv) = (ru, rv)
      oldPointer = pointer
      go to step 3
2. For each line segment (xl, y) −> (xg, y)
   (deltaX, deltaY) = (xl − oldX, y − oldY)
   (ru, rv) = (oldRu, oldRv) −
      (deltaX + dxy_du * deltaY, deltaY)
   pointer = oldPointer
   while (ru < 0)
      ru = ru + |dx_du|
      pointer = pointer +
         (sign(dx_du) * size(image pixel))
   while (ru >= |dx_du|)
      ru = ru − |dx_du|
      pointer = pointer −
         (sign(dx_du) * size (image pixel))
   while (rv < 0)
      rv = rv + |dy_dv|
      pointer = pointer +
         (sign(dy_dv) * width of image)
   while (rv >= |dy_dv|)
      rv = rv − |dy_dv|
      pointer = pointer −
         (sign(dy_dv) * width of image)
   (oldX, oldY) = (x, y)
   (oldRu, oldRv) = (ru, rv)
   oldPointer = pointer
3. For each line segment (x, y) −> (xg, y)
   (E.g., when the distance is 5.xx pixels, increment ru by 1 to allow generation of 6 pixels)
   ru = ru + Fix(1)
   len = xg − x
   while (len > 0)
      imglen = IntPart(ru)
      if (imglen != 0), render image at pointer for len imglen
      len = len − imglen
      ru = FracPart(ru) + |dx_du|
         pointer = pointer + (sign(dx_du) * size (image pixel))

The primary difference between this and the previous method is that rv now represents the vertical distance to the next image pixel and is not used to render line segments. It is used when changing scan lines to determine whether a new source image pixel in the vertical direction is being rendered.

In certain special cases, rendering can be even faster. For the 0° rotation case where dx_du is greater than four (4) (more than four device pixels per source pixel), a pipeline can contain both the current and next image values. Where the current device pixel is less than four (4) device pixels (1 nibble) away from the next source pixel value, the comparator can assume that the rest of the nibble belongs to the next image value. This allows the assembler to output four device pixels per clock cycle.

Differences in Errors

Another advantage of the method of this invention is that the errors obtained from the use of fixed point numbers are smaller than the errors obtained using the old method. In particular, the errors generated using the old method increased four (4) times whenever the resolution of the device doubled. The errors from the method of the invention decrease two (2) times when the resolution is doubled. The prior art method converts the transformation matrix into fixed point and adds the fixed point values for each device pixel, with a resulting error limited essentially to the round-off error times the number of device pixels. The method of this invention uses the inverse of the transformation matrix converted into fixed point and adds these values for each image pixel, with a resulting error of essentially to the round-off error times the number of source image pixels.

For a 300 dpi image transferred onto a 300 dpi device, the transformation matrix is scalar (i.e. [1.0 0 0, 1.0 0 0]). Both the prior art method and the method of this invention have 16 bits of accuracy in representation of integers (1.0 and the inverse of 1.0) and the round-off errors are the same. Furthermore, the number of device pixels and image pixels are the same. Therefore, the accumulated errors are about the same.

For the same 300 dpi image transferred onto a 1200 dpi device, the transformation matrix becomes [0.25 0 0, 0.25 0 0]. The prior art method uses a fixed point number with 14 bits of accuracy (0.25) while the method of this invention uses a fixed point number with 18 bits of accuracy ($1/0.25 = 4.0$). This gives 16 times more accuracy in the round-off errors using the method of this invention. Furthermore the number of device pixels is increased by four (4) for the same number of source image pixels. Therefore the total accumulated error is 64 times greater using the prior art method.

A similar calculation can be made when scaling the other direction (i.e. 300 dpi image→75 dpi device), where the method of this invention is 64 times less accurate than the prior art method. However it is not as important that the method map device pixels into the correct image pixel when image pixels are being skipped because of down-scaling.

Output as Input Plus Transfer Function

GCP 10 can also implement an arbitrary transfer function. In a typical application, a selected gray level will be selected to have a resolution similar to that available in the source image. For example, an 8 bit source will be rendered using an 8 bit gray level. It is sometimes necessary to adjust gray levels, for example, when using different marking engines. A look-up table can be prepared using dedicated RAM (e.g. $256 \times 8$), contained in SI 29B shown in FIG. 2. The output image is combined in PIX 28 using the source image value or the gray level from the look-up table. A look-up table can be downloaded from external memory in accordance with a display list instruction.

Anti-Aliasing Generator Operation

Screening gives an image that is most suitable for reproduction. There are several types of screening, only one of which is halftone screening. The latter method is implemented in the system and method of this invention.

At high screen frequencies, a halftone cell may contain less than 256 pixels, at which point that screen cannot accurately represent a 256 level gray scale. If the halftone cell is $10 \times 10$ pixels, that cell can only show 101 levels of gray. This is a particular limitation in a blend (gray or color) because discontinuities between discrete, indexed gray levels show up as distinct "bands". The occurrence of this banding is quite common in both gray and color screening, particularly in a region of slowly changing gray or color values as in a gradual blend or portions of a sky or wall.

Using prior art methods and introducing an error term into the gray level for each halftone cell, adjacent cells will be a bit darker or lighter than adjacent cells that nominally have the same gray level. This allows more gray levels but gives a "noisier" appearance. If the error term is precomputed, a fixed pattern of noise may be discernable in the final image.

The system and method of this invention can create a more random noise pattern by injecting differing amounts of noise when each source pixel is compared with each threshold level, generating up to two bits of noise (the least significant bits) in random pixels at the resolution of the output device. Four separate, uncorrelated pseudo-random noise generators are used for each of the screen comparators. Each noise generator produces a new noise sample on every clock cycle, which can be scaled from 0 to 2 bits in amplitude. The pseudo-random noise generators can be selectively turned on or off. This can be used for fixed gray level fills or for image fills as well as for blends.

Banding problems actually get more severe as the resolution of printers gets better. Screen frequencies of 133 or 150 lines per inch (lpi) are traditional, but a modern, high quality press can print 175 to 250 lpi and printers and press operators prefer to use the full resolution available. Image-setters are also getting better. However, an image-setter capable of printing 2540 dpi can print a 200 lpi screen as a $12 \times 12$ halftone cell, which can display only 145 gray levels. Blends under these conditions using prior art techniques show severe banding. The system and method of this invention diminishes that banding considerably.

A general description of the system and method of using the present invention as well as a preferred embodiment of the present invention has been set forth above. One skilled in the art will recognize and be able to practice additional variations in the methods described and variations on the device described which fall within the teachings of this invention.

What is claimed is:

1. A system for generating a rasterized graphic image having a region containing a plurality of device pixels, said region being described by one or more digital input commands including a command to fill said region with a halftone screen pattern, said system comprising:

an input section for receiving digital input commands including a command which describes said region and a command which specifies a mode for filling said region;

a command interpreter coupled to said input section for interpreting said digital input commands and for translating the digital input commands which describe said region into internal commands for use inside said system;

a screening section coupled to said input section and to said command interpreter for screening with a halftone threshold array a plurality of device pixels selected from the pixels contained in said region during a clock cycle;

a threshold memory coupled to said screening section for storing halftone threshold array values; and a rendering section coupled to said command interpreter and to said screening section for rendering and outputting device pixel data for said plurality of device pixels contained in said region, said device pixel data being in a form for display on a raster device.

2. The system of claim 1 further comprising a means in said screening section for accessing a selected plurality of said halftone threshold array values from said threshold memory during a clock cycle.

3. The system of claim 1 further comprising a means in said rendering section for rendering a selected plurality of device pixels during a clock cycle.

4. The system of claim 1 further comprising a means for determining absolute screen phase within said region of said rasterized graphic image and a means for aligning and rendering said halftone screen pattern in the absolute screen phase so determined.

5. The system of claim 1 implemented on a single semiconductor chip.

6. The system of claim 1 further comprising a first input buffer coupled to said command interpreter for storing a said digital input command.

7. The system of claim 1 further comprising:
memory means for storing device pixel data;
means for accessing preexisting device pixel data from said memory means, where said preexisting device pixel data has been previously set or previously rendered; and
a second input buffer coupled to said rendering section to store preexisting device pixel data.

8. The system of claim 1 further comprising an output buffer coupled to said rendering section for storing said device pixel data.

9. The system of claim 1 further comprising a main control sequencer coupled to said command interpreter for parsing said digital input commands and for identifying and allocating tasks to various sections of said system.

10. The system of claim 1 further comprising means for using a source image comprised of a plurality of source image pixels where each said source image pixel is to be mapped to corresponding device pixels and rendered to display a device image corresponding to said source image, said system further comprising means for calculating, for one of said source image pixels, device pixel data for the corresponding device pixels.

11. The system of claim 10 further comprising a source image which has been modified by scaling and rotation.

12. The system of claim 10 further comprising a third input buffer coupled to said rendering section to store a source image or a mask.

13. The system of claim 1 further comprising means for adding substantially random noise values to said device pixel data.

14. A method for generating a rasterized graphic image having a region containing a plurality of device pixels, said region being described by two or more digital input commands, said digital input commands including a command to fill said region with a halftone screen pattern, said rasterized graphic image being in a form for display on a raster display device or raster marking engine, said method comprising the steps of:

receiving a first digital input command which describes said region;

receiving a second digital input command which specifies a mode for filling said region with device pixel data;

translating said first and second digital input commands into at least one internal command to be executed in parallel with a second internal command;

for each of a plurality of said device pixels, substantially simultaneously, if said region is to be filled with a selected gray level,
correlating each device pixel with a corresponding threshold value in a reference array of threshold values, said reference array of threshold values corresponding to an array of pixels in a halftone screen pattern,
comparing said selected gray level with said corresponding threshold value, and
rendering each device pixel by setting device pixel data for each device pixel according to its corresponding threshold value, said selected gray level and said second digital input command;

or if said region is to be filled with a solid color,
rendering each device pixel by setting device pixel data for each device pixel according to said solid color and said second digital input command; and outputting said device pixel data in a form for display on a raster display device or a raster marking engine, whereby said region is filled with device pixel data to form a halftone screen pattern or a solid color.

15. The method of claim 14 wherein said first and said second digital input commands comprise a single command.

16. The method of claim 14 further comprising the step of aligning said halftone screen pattern for said region in absolute screen phase.

17. The method of claim 14 further comprising filling said region with a selected gray level by setting device pixel data for each device pixel to a first binary state if said selected gray level is greater than said corresponding threshold value and to an opposite binary state if said selected gray level is less than said corresponding threshold value.

18. The method of claim 14 wherein at least some device pixel data has been set, said method further comprising the step of accessing preexisting device pixel data and modifying said preexisting device pixel data in accordance with a mode specified by said second digital input command.

19. The method of claim 18 wherein
preexisting device pixel data for a plurality of device pixels is stored within a single memory word and said region includes one or more scan lines
and wherein, for each scan line contained within said region, said region has a left boundary at the left-most pixel that is within said region and on said scan line and a right boundary at the right-most pixel within said region and on said scan line,
said left-most pixel having corresponding first preexisting device pixel data stored in a first memory word and said right-most pixel having corresponding second preexisting device pixel data stored in a memory word which may be said first memory word or may be a second memory word, said method further comprising selectively accessing said first memory word and the memory word containing said second preexisting device pixel data and rendering device pixel data for said scan line in said region between said left-most pixel and said right-most pixel.

20. The method of claim 14 further comprising the step of calculating or retrieving from memory a precalculated reference array of threshold values as a halftone screen pattern at an arbitrary, specified spacing and arbitrary, specified screen angle.

21. The method of claim 14 further comprising the step of filling said region of said rasterized graphic image with a selected input image.

22. The method of claim 14 wherein said first and second digital input commands comprise display list information.

23. The method of claim 14 further comprising adding substantially random noise values to said device pixel data for each device pixel.

24. The method of claim 14 wherein said first digital input command is selected from a group consisting of:
select said region from a designated memory location; and
create said region using specified coordinates.

25. The method of claim 14 wherein said second digital input command is selected from a group consisting of:
fill said region as a halftone screen with a specified gray level;
fill said region as at least one halftone screen with a specified color;
fill said region using black pixels;
fill said region using white pixels;
fill said region using opaque pixels; and
fill said region using a mask, where said mask can be found in a designated location in memory or can be generated using predetermined information.

26. The method of claim 14 wherein a source image is comprised of source image pixels, said method further comprising a third digital input command selected from a group consisting of:
define a source image;
scale a source image;
rotate a source image;
shear a source image;
flip a source image;
clip a source image;
define an image mask; and
fill said region with an image.

27. The method of claim 26 wherein said first, second and third digital input commands comprise one or two commands.

28. The method of claim 14 further comprising a fourth digital input command defining a clipping region.

29. The method of claim 28 wherein said first, second and fourth digital input commands comprise one or two commands.

30. The method of claim 14 further comprising using a system with a plurality of sections, each said section operating independently and simultaneously, said method further comprising:
parsing one of said first or second input commands into one or more internal commands, each to be executed within or by a specified said section of said system;
distributing each of said internal commands to said specified section; and
rendering said region.

31. The method of claim 14 further comprising using a source image comprised of a plurality of source image pixels where each said source image pixel is to be mapped to corresponding device pixels and rendered to display a device image corresponding to said source image, said method further comprising calculating for one of said source image pixels the corresponding device pixels.

32. The method of claim 31 wherein said source image has been modified by arbitrary scaling and rotation.

33. The method of claim 31 further comprising determining for one of said source image pixels a number of device pixels that can be rendered using said one source image pixel.

34. The method of claim 31 further comprising determining which source image pixel to use next.

35. The method of claim 31 further comprising determining an inverse transformation matrix to calculate corresponding device pixels based on one of said source image pixels.

36. A method for generating a rasterized graphic image having a region containing a plurality of device pixels, said region being described by two or more digital input commands, said digital input commands including a command to fill said region with a halftone screen pattern and said rasterized graphic image being in a form for display on a raster display device or raster marking engine, said method comprising:
receiving a first digital input command which describes said region;
receiving a second digital input command which specifies a mode for filling said region with device pixel data;
translating said first and second digital input commands into at least one internal command to be executed in parallel with a second internal command;
for a source image comprised of source image pixels, said source image having been modified by scaling and rotation, and where each pixel of said source image pixels are to be mapped to a plurality of corresponding device pixels and rendered to display a device image corresponding to said source image, calculating for one of said source image pixels the corresponding device pixel; and
determining for said pixel of said source image a plurality of device pixels that can be rendered using said one source image pixel.

* * * * *